No. 737,111. PATENTED AUG. 25, 1903.
S. JONES.
GARDEN PLOW.
APPLICATION FILED DEC. 4, 1902.
NO MODEL. 2 SHEETS—SHEET 1.
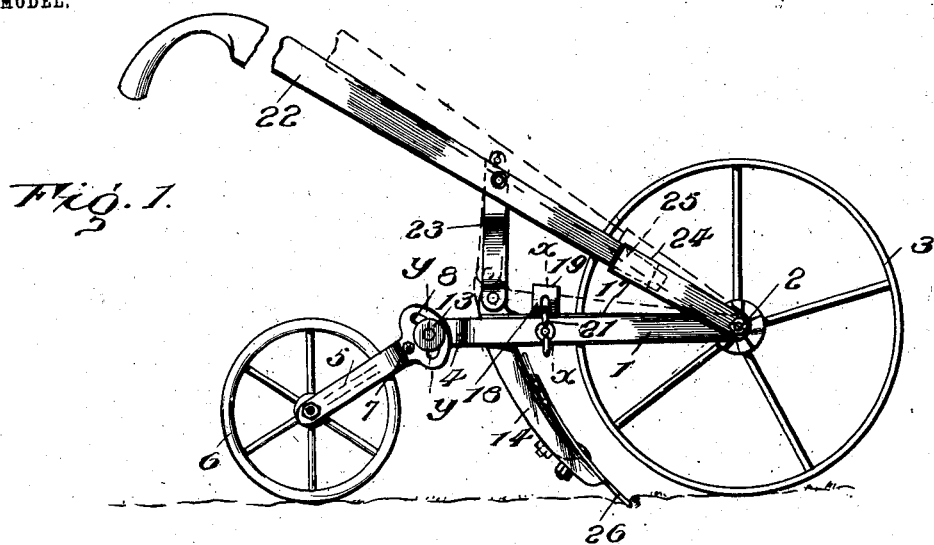
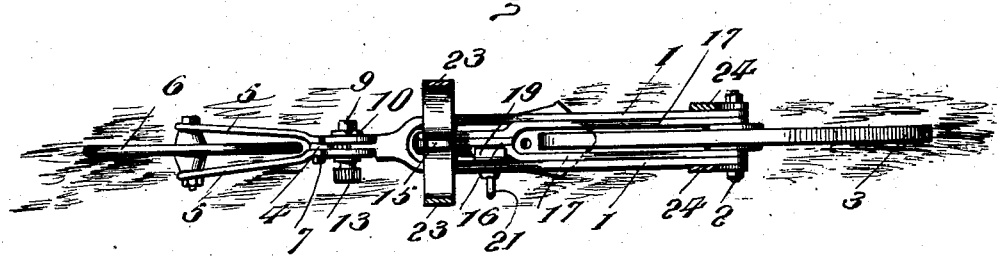
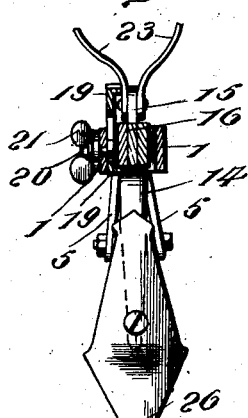
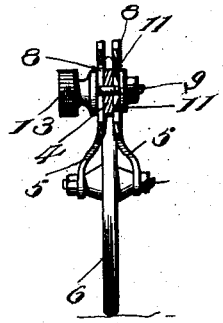
WITNESSES:
Jno. Robb
George G. Watt
INVENTOR
Samuel Jones
BY Lacey
Attorney No. 737,111. PATENTED AUG. 25, 1903.
S. JONES.
GARDEN PLOW.
APPLICATION FILED DEC. 4, 1902.
NO MODEL. 2 SHEETS—SHEET 2.
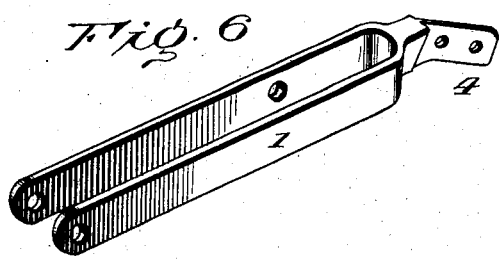
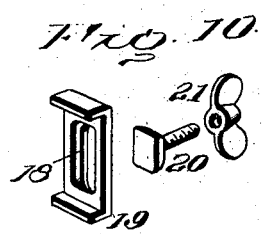
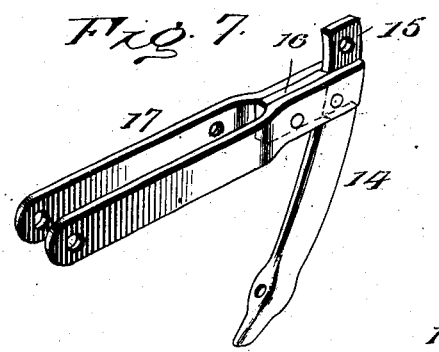
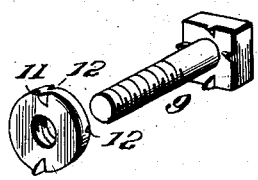
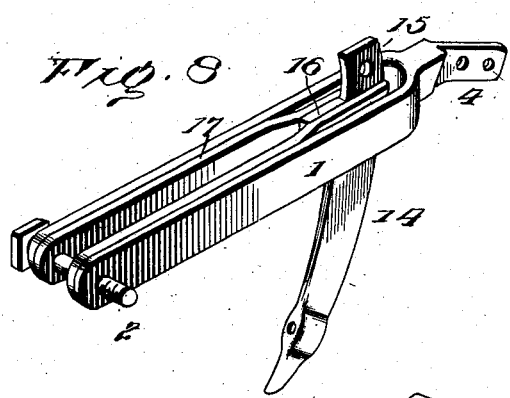
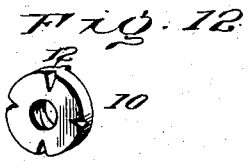
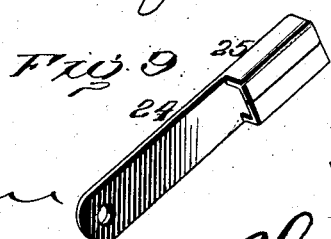
WITNESSES:
INVENTOR
Samuel Jones
BY
Attorneys No. 737,111.　　　　　　　　　　　　　　　　Patented August 25, 1903.

UNITED STATES PATENT OFFICE.

SAMUEL JONES, OF JACKSON, OHIO.

GARDEN-PLOW.

SPECIFICATION forming part of Letters Patent No. 737,111, dated August 25, 1903.

Application filed December 4, 1902. Serial No. 133,909. (No model.)

*To all whom it may concern:*

Be it known that I, SAMUEL JONES, a citizen of the United States, residing at Jackson, in the county of Jackson and State of Ohio, have invented certain new and useful Improvements in Garden-Plows, of which the following is a specification.

In machinery for tilling the soil and operable by hand, as garden or truck plows and cultivators, it is desirable to mount the implement on a wheel-frame and have the plow vertically adjustable independent of the frame and at all times under the instant control of the operator. To meet these requirements, a novel form of implement has been devised, the same being fully disclosed in the appended description and drawings.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a side elevation of a plow embodying the invention. Fig. 2 is a top plan view, the handles and braces being in section. Fig. 3 is a section on the line X X of Fig. 1. Fig. 4 is a section on the line Y Y of Fig. 1. Fig. 5 is a perspective view of the upper end portion of the standard. Fig. 6 is a detail perspective view of the front section of the wheel-frame. Fig. 7 is a detail perspective view showing the beam and standard. Fig. 8 is an enlarged perspective view showing the beam and standard in their relative position upon the front section of the wheel-frame. Fig. 9 is a detail perspective view of one of the handle-irons, showing more clearly the wings at the lower ends thereof. Fig. 10 is a detail perspective view, parts separated, of the gage. Fig. 11 is a detail perspective view of the fastening, showing the washer and nut members thereof. Fig. 12 is a detail perspective view of the washer member.

Corresponding and like parts are referred to in the following description and indicated in all the views of the drawings by the same reference characters.

The implement comprises, essentially, a wheel-frame and a plow or cultivator, the latter having pivotal connection with the wheel-frame and adapted to be raised and lowered at the will of the operator to admit of projecting the plow or cultivator point so as to penetrate the soil to a greater or less depth.

The wheel-frame comprises a front section and a rear section pivotally connected and relatively adjustable. The front section of the wheel-frame comprises longitudinal bars 1, spaced apart and transversely pierced at their front ends to receive the axle 2, upon which the front ground-wheel 3 is mounted. The rear ends of the longitudinal bars 1 are brought together and welded or secured in any convenient way to a stem 4, which is rearwardly and downwardly inclined. The rear section of the wheel-frame is composed of companion bars 5, spaced apart and having their lower rear ends transversely pierced to receive the axle upon which the rear ground-wheel 6 is mounted. The forward ends of the bars 5 are brought together against opposite sides of the stem 4 and are pivotally connected thereto at 7, the end portions forward of the pivot-fastening 7 being widened and formed with arcuate slots 8, which receive the bolt or fastening 9, by means of which the rear wheel-section is secured to the front section in the required adjusted position. A washer 10 is mounted upon the bolt 9 and has inner extensions 11 to enter the slot 8 of the adjacent bar 5, thereby preventing turning of the washer. The head of the bolt 9 has inner extensions to enter notches or grooves 12, formed in the outer side of the washer 10, thereby securing the bolt against turning when tightening or loosening the clamp-nut 13. When the bolt or fastening 9 is loosened, the rear section of the wheel-frame is adapted to turn upon the pivot-fastening 7, thereby admitting of adjustment of the plow or cultivator independent of its pivotal connection with the wheel-frame, as will appear more fully hereinafter.

The cultivator or plow comprises a beam, standard, and plow or cultivator point. The standard 14 is forwardly curved toward its lower end and is provided at its upper end with a vertical extension 15 and a front extension 16. The beam is composed of companion members 17, having their rear ends brought together and secured to opposite sides of the extensions 15 and 16 and having their front ends transversely apertured to receive the axle 2. The companion members 17, like the longitudinal bars 1, are transversely spaced to receive the ground-wheel 3, and the beam and standard have movement in the space formed between the longitudinal bars 1. A gage 18 is secured to a bar 1 and is provided with inner extensions 19, located in the path of the beam, so as to limit the vertical play thereof, said inner extensions 19 constituting stops. The gage 18 is adjustably connected with its supporting-bar 1 and is vertically slotted to receive the headed end of a bolt 20, provided upon its outer end with a clamp-nut 21, by means of which the gage is secured in an adjusted position.

The handle-bars 22 are mounted upon the axle 2 and are connected with the standard by means of braces 23, the lower converged ends of which are secured to opposite sides of the upper end of the vertical extension 15 of the standard. The handle-bars have adjustable connection with the upper ends of the braces 23 to admit of their rear ends being raised or lowered to suit the convenience of the operator. Irons 24 connect the lower ends of the handle-bars 22 with the axle 2 and consist, preferably, of straps having their lower ends mounted upon the axle 2 and their upper rear ends formed with wings 25, which are bent to embrace the sides of the handle-bars and form sockets for their reception.

The plow or cultivator point 26 is secured to the lower end of the standard 14 in any substantial manner and may be of any type and is preferably double-pointed and reversible to admit of either point being brought into working position. The range of vertical play of the plow or cultivator is determined by the vertical distance between the stops 19, and its relative position to the wheel-frame may be determined, first, by the vertical adjustment of the gage 18 and, second, by the adjustment of the rear section of the wheel-frame or by a combination of both adjustments.

Having thus described the invention, what is claimed as new is—

1. In an implement of the character described, and in combination with a plow-point, a frame composed of sections pivotally connected and provided with supporting means, a plow loosely pivoted to said frame and thereby adapted for vertical movement with relation thereto, and stop means for limiting the vertical movement of the plow, substantially as set forth.

2. In an agricultural implement, the combination with a supporting-frame, and a plow pivotally connected thereto, a gage coöperating with the plow and frame to limit the vertical play of said plow, substantially as set forth.

3. In combination with a supporting-frame and a plow pivotally connected thereto, a gage for limiting the vertical movements of the plow, and means for adjustably connecting said gage with its supporting part, substantially as specified.

4. In combination, a supporting-frame composed of sections relatively adjustable, a plow having pivotal connection with said frame, a gage for limiting the vertical play of the plow, and means for adjustably connecting said gage with its supporting part, substantially as described.

5. In combination, a sectional frame composed of pivoted parts, means for securing the sections in an adjusted position, the front section of the frame being composed of transversely-spaced parts, a plow-beam arranged in the space formed between the members of the front section of the frame, an axle pivotally connecting the plow-beam and frame, a ground-wheel mounted upon said axle, handle-bars connected with said axle, and a gage between the plow-beam and frame to limit the vertical movements of the plow, substantially as set forth.

In testimony whereof I affix my signature in presence of two witnesses.

SAMUEL JONES. [L.S.]

Witnesses:
EVAN E. EUBANKS,
EUGENE C. LAIRD.